United States Patent [19]
Yamura et al.

[11] Patent Number: 5,568,007
[45] Date of Patent: Oct. 22, 1996

[54] LAMP UNIT AND OPTICAL ANALYZER USING THE SAME

[75] Inventors: Hiroaki Yamura; Takeshi Kanomata; Shin-ichi Kikuchi, all of Hachioji, Japan

[73] Assignee: Jasco Corporation, Hachioji, Japan

[21] Appl. No.: 280,348

[22] Filed: Jul. 25, 1994

[30] Foreign Application Priority Data

Jul. 28, 1993 [JP] Japan ................................. 5-207164
Nov. 29, 1993 [JP] Japan ............................. 5-068421 U

[51] Int. Cl.⁶ ........................... H01J 61/82; G01J 3/10
[52] U.S. Cl. .................. 313/35; 362/373; 362/374; 362/375; 362/264; 356/256
[58] Field of Search .................. 313/35; 362/373, 362/374, 375, 264; 356/256, 328

[56] References Cited

U.S. PATENT DOCUMENTS

| | | | |
|---|---|---|---|
| 4,539,625 | 9/1985 | Bornstein et al. | 362/264 |
| 4,665,472 | 5/1987 | Chang | 362/373 |
| 5,071,250 | 12/1991 | McGee | 356/328 |
| 5,111,367 | 5/1995 | Churchill | 362/373 |

FOREIGN PATENT DOCUMENTS

| | | |
|---|---|---|
| 0324652 | 7/1989 | European Pat. Off. . |
| 0502273 | 9/1992 | European Pat. Off. . |
| 3323875 | 1/1985 | Germany . |
| 4238731 | 5/1994 | Germany . |
| 57-212425 | 12/1982 | Japan . |

OTHER PUBLICATIONS

Patent Abstracts of Japan, V.14, N.301 (P–1069) 28 Jun. 90 & JP–A–02 095 220 (Kawasaki Kazuhiro et al.) 6 Apr. 90–abstract.

Patent Abstracts of Japan, V.14, N.44 (P–996) 26 Jan. 90 & JP–A–01 276 023 (Minolta Camera Co., Ltd) 6 Nov. 89–abstract.

Patent Abstracts of Japan, V.6, N.53 (P–109) 8 Apr. 82 & JP–A–56 166 449 (Yokogawa Hokushin Electric Corp) 21 Dec. 81–abstract.

*Primary Examiner*—Nimeshkumar D. Patel
*Attorney, Agent, or Firm*—Ronald R. Snider

[57] ABSTRACT

A lamp unit is provided with a projecting portion on the inner wall of the lamphouse in the vicinity of the arc portion. The lamphouse is ventilated by the van provided at one end of the lamphouse and the vent provided at the other end. The inner diameter of the lamphouse at the arc portion provided with the projecting portion is smaller than that of both end portions, so that the flow velocity of the air passing through the lamphouse is higher in the vicinity of the arc portion, which produces a heat of a high temperature. Even if the lamp is horizontally installed, which lowers the heat dissipation efficiency, since the lamp is adequately air-cooled, an extreme temperature rise is prevented. The lamphouse is removeably mounted, and the lamp is mounted in a cartridge. The cartridge may be inserted into the lamphouse for replacement of the lamp.

3 Claims, 9 Drawing Sheets

LAMP UNIT AND OPTICAL ANALYZER USING THE SAME

BACKGROUND OF THE INVENTION

1. Field of the Invention

The present invention relates to a lamp unit and, more particularly, to an improvement of a cooling mechanism and a lamp replacing mechanism for a short arc type lamp.

2. Description of the Related Art

As a light source of an optical analyzer such as a fluorescence detector, short arc type lamps such as a xenon lamp, metal halide lamp and a mercury lamp are generally used.

Figure 5:
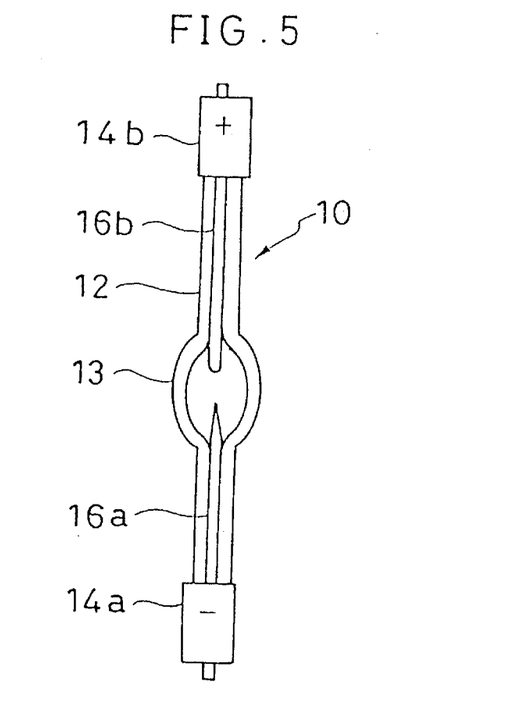
FIG. 5 is a schematic explanatory view of the structure of a xenon lamp.

FIG. 5 shows a general structure of a xenon short arc type lamp (hereinunder referred to as "xenon lamp"). As shown in FIG. 5, a xenon lamp 10 is composed of a long and narrow bulb 12, electrode bases 14a, 14b into which both ends of the bulb 12 are fitted, and electrode cores 16a, 16b implanted in the electrode bases 14a and 14b, respectively.

A spherical bulb portion 13 filled with xenon gas is formed at the center of the bulb 12, and the tips of the electrode cores 16a and 16b are in close proximity with each other in the spherical bulb portion 13.

A high voltage is applied to the electrode bases 14a, 14b so as to cause arc discharge between the electrode cores 16a and 16b and to light the xenon lamp 10 thereby.

When the xenon lamp 10 is lighted, a large quantity of heat is produced between the electrode cores 16a, 16b where arc discharge is caused, so that the temperature of the tube wall of the spherical bulb portion 13 rises. For example, in the case of a 150-W xenon lamp, the pressure in the spherical bulb portion 13 reaches as high as 40 to 50 atm. Therefore, if the heat dissipation at the tube wall of the spherical bulb portion 13 is insufficient, there is a fear of the spherical bulb portion 13 bursting due to a temperature rise.

If the temperature in the spherical bulb portion 13 abnormally rises, there is a fear that the property of the glass constituting the spherical bulb portion 13 changes, which may lead to what is called devitrification.

Figure 6:
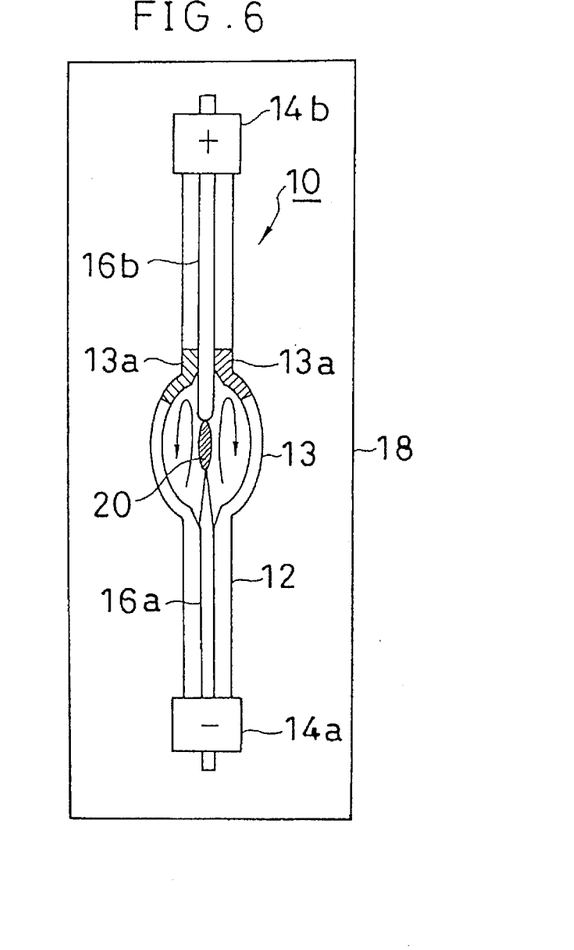
FIG. 6 is an explanatory view of the xenon lamp shown in FIG. 5 which is vertically installed in a lamphouse.
Figure 7:
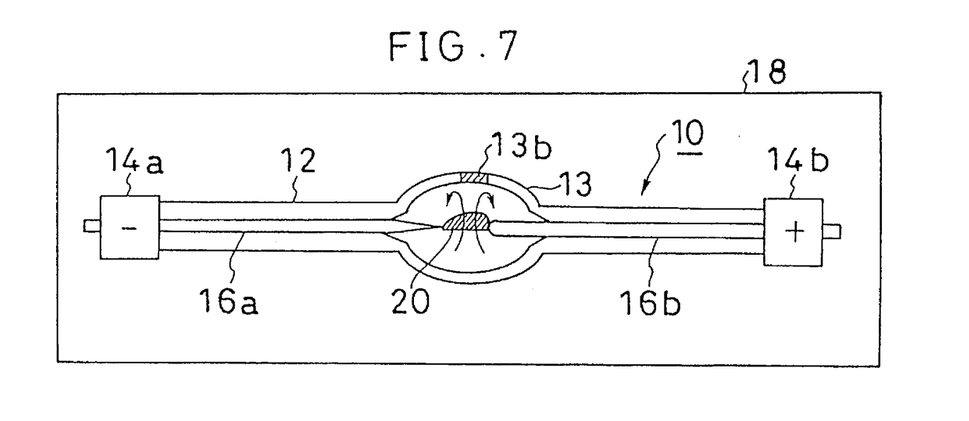
FIG. 7 is an explanatory view of the xenon lamp shown in FIG. 5 which is horizontally installed in a lamphouse.

The rise in the temperature of the tube wall of the spherical bulb portion 13 is different between in the lamp (hereinunder referred to as "vertically installed lamp") which is installed in a lamphouse 18 in such a manner that the longitudinal portion of the bulb 12 is perpendicular to the bottom of the lamphouse 18, as shown in FIG. 6 and the lamp (hereinunder referred to as "horizontally installed lamp") which is installed in the lamphouse 18 in such a manner that the longitudinal portion of the bulb 12 is horizontal to the bottom of the lamphouse 18, as shown in FIG. 7.

When the xenon lamp 10 is lighted, the convection current of the xenon gas indicated by the arrows in FIGS. 6 and 7 is produced in the spherical bulb portion 13 due to the heat produced from the arc 20, and the heat of the arc 20 is carried on the convection current upward in the spherical bulb portion 13.

In the vertically installed lamp shown in FIG. 6, since the heat carried upward in the spherical bulb portion 13 is diffused in a comparatively wide area (hatched portions 13a in FIG. 6) in the vicinity of the neck portion of the spherical bulb portion 13 and dispersed, it is possible to comparatively suppress the rise in the temperature in the spherical bulb portion 13.

On the other hand, in the horizontally installed lamp shown in FIG. 7, since the heat carried upward in the spherical bulb portion 13 concentrates on a certain limited point (hatched portions 13b in FIG. 7) of the spherical bulb portion 13, the heat dissipation efficiency is low, which results in an abnormal temperature rise in the spherical bulb portion 13.

For this reason, in a conventional optical analyzer, the xenon lamp 10 is vertically installed in the lamphouse 18 so as to prevent an extreme temperature rise in the spherical bulb portion 13.

The vertically installed lamp 10 in an optical analyzer, however, suffers from various problems.

Firstly, if the xenon lamp 10 is vertically installed in the lamphouse 18, the height of the lamphouse 18 becomes larger than the length of the bulb 12, so that the height of the optical analyzer itself becomes large. In other words, it is inevitable to increase the size of the optical analyzer.

Secondly, it is necessary to limit the height of the optical analyzer to the height of the lamphouse 18 in order to hold down the increase in the size of the optical analyzer to the minimum. It is therefore impossible to dispose an optical system, an electric system, etc. in the upper portion or the lower portion of the lamphouse, so that the degree of freedom in designing is restricted.

Thirdly, since it is often the case that another apparatus is laid on the optical analyzer for analysis and measurement, it is desirable to provide a lamp insertion hole not on the upper surface of the analyzer but on the side surface thereof so as to facilitate the replacement of the xenon lamp 10. It is further desirable from the point of view of the degree of freedom in designing and the mechanical strength that the lamp insertion hole is as small as possible so long as it is sufficiently large to facilitate the replacement of the xenon lamp 10. However, if the xenon lamp 10 is vertically installed in the lamphouse 18, when the lamp insertion hole is provided on the side surface of the analyzer, the diameter of the lamp insertion hole becomes larger than the length of the xenon lamp 10, so that the degree of freedom in designing and the mechanical strength are greatly lowered. Therefore, in order to reduce the diameter of the lamp insertion hole, it is necessary to provide the lamp insertion hole on the upper surface of the analyzer.

In this way, the vertically installed xenon lamp 10 has various problems.

These problems are solved by horizontally installing the xenon lamp 10 in the lamphouse 18, but in this case, the problem of an extreme temperature rise in the spherical bulb portion 13 remains unsolved.

If a pulsation lighting method is adopted to the xenon lamp 10, the calorific power of the arc is reduced and the problem of a temperature rise is solved, but this method is not practical because the intensity of light at each flash is not uniform, thereby producing large noise.

In addition, the horizontally installed xenon lamp 10 produces a problem that arc produced between the electrode cores 16a, 16b distorts as well as the problem of a temperature rise. This is because the arc 20 is largely bent upward due to the convection current of the xenon gas, as shown in FIG. 7, while in the vertically installed xenon lamp 10, the arc 20 is produced symmetrically with respect to the center axis of the xenon lamp 10, as shown in FIG. 6.

As a result, the light emission of the horizontally installed xenon lamp 10 becomes unstable, which is a cause of an increase in the noise of the analyzer, and it is impossible to efficiently collect the light emitted from the arc 20 due to the distortion of the arc 20.

If the curve of the arc 20 becomes extremely large, the arc 20 comes into contact with the tube wall of the spherical bulb portion 13, so that the temperature of the tube wall further rises, thereby enhancing the risk of a burst of the spherical bulb portion 13 and devitrification of the glass.

Even in the case of horizontally installing the xenon lamp 10 in the lamphouse 18, although it is possible to make the diameter of the lamp insertion hole comparatively small, a problem still remains unsolved that the lamp insertion hole is formed at a certain cost of the degree of freedom in designing and the mechanical strength.

SUMMARY OF THE INVENTION

Accordingly, it is a first object of the present invention to eliminate the above-described problems in the related art and to provide a lamp unit and an optical analyzer using the lamp unit which prevents a rise in the temperature in the bulb due to the heat produced from the arc by continuous lighting and which does not produce a distortion in the arc even the longitudinal portion of a short arc type lamp is horizontally installed.

It is a second object of the present invention to provide an optical analyzer provided with a lamp replacing mechanism which facilitates the replacement of a lamp without lowering the degree of freedom in designing and the mechanical strength of the analyzer as a whole.

To achieve the first object, in a first aspect of the present invention, there is provided a lamp unit comprising: an arc lamp; a lamphouse accommodating the arc lamp; a fan provided on one end of the lamphouse so as to introduce air into the lamphouse; a vent for allowing air to escape from the lamphouse or enter the lamphouse therefrom; and a projecting portion provided on the inner wall of the lamphouse in the vicinity of the periphery of the arc portion of the arc lamp.

In a lamp unit provided in a second aspect of the present invention, the arc lamp is a short arc type lamp which is long and narrow, and arc discharge is caused in the vicinity of the central portion of the lamp. The lamp is a horizontally installed lamp which is installed in the lamphouse in such a manner that the longitudinal portion of the lamp is substantially horizontal.

In a lamp unit provided in a third aspect of the present invention, the lamp bulb is composed of quartz glass having an extremely low transmission with respect to ultraviolet ray of not more than 220 nm.

A lamp unit provided in a fourth aspect of the present invention is provided with a magnet in the vicinity of the lamp which produces an arc. The magnet is disposed at a position where the electromagnetic force is produced in the direction in which the arc is pressed down by the interaction between the magnetic flux produced around the arc and the magnetic flux produced from the magnet.

In a lamp unit provided in a fifth aspect of the present invention, the magnet is provided, and the upper wall portion of the lamphouse is formed of an ferromagnetic plate.

An optical analyzer provided in a sixth aspect of the present invention incorporates the lamp unit provided in one of the first to fifth aspects of the present invention.

A lamp unit according to the present invention is provided with the fan at one end of the lamphouse, as described above. By rotating the fan, air is introduced into the lamphouse. Since the vent is provided in the lamphouse, ventilation is conducted between the fan and the vent.

Since the projecting portion is provided in the inner wall of the lamphouse in the vicinity of the arc portion of the lamp, the inner diameter of the lamphouse at the projecting portion is smaller than that of the other portion by the dimension of the projection.

Consequently, the flow velocity of the air passing through the lamphouse is higher in the vicinity of the arc portion of the lamp than at the both end portions of the lamphouse. The heat dissipation efficiency is very high at the bulb portion having a high temperature, and the heat dissipation efficiency is suppressed at both ends of the bulb where the temperature is comparatively low. Thus, the heat produced at the arc portion is dissipated from the lamp tube wall with high efficiency, and it is possible to reduce the difference of temperature in localities of the lamp.

Therefore, even if the short arc type lamp is a horizontally installed lamp, which has a very low heat dissipation efficiency, it is possible to suppress an abnormal rise in temperature of the lamp, and to prevent a burst of the lamp and devitrification of the glass.

It is known that ordinary quartz glass, which is generally used as the bulb material of the lamp, produces a distortion and the mechanical strength thereof is lowered when ultraviolet ray of not more than 220 nm passes therethrough. Especially, when the lamp is air-cooled so as to prevent a rise in temperature, the distortion is accumulated and becomes remarkable.

As a countermeasure, in the lamp unit provided in the third aspect of the present invention, as the bulb material of the lamp, quartz glass having an extremely low transmission with respect to ultraviolet ray of not more than 220 nm is used, thereby preventing the distortion.

The lamp unit provided in the fourth aspect of the present invention is provided with the magnet in the vicinity of the lamp which produces an arc. The magnet is disposed at a position where the downward electromagnetic force is produced so that the arc is pressed down.

Figure 4:
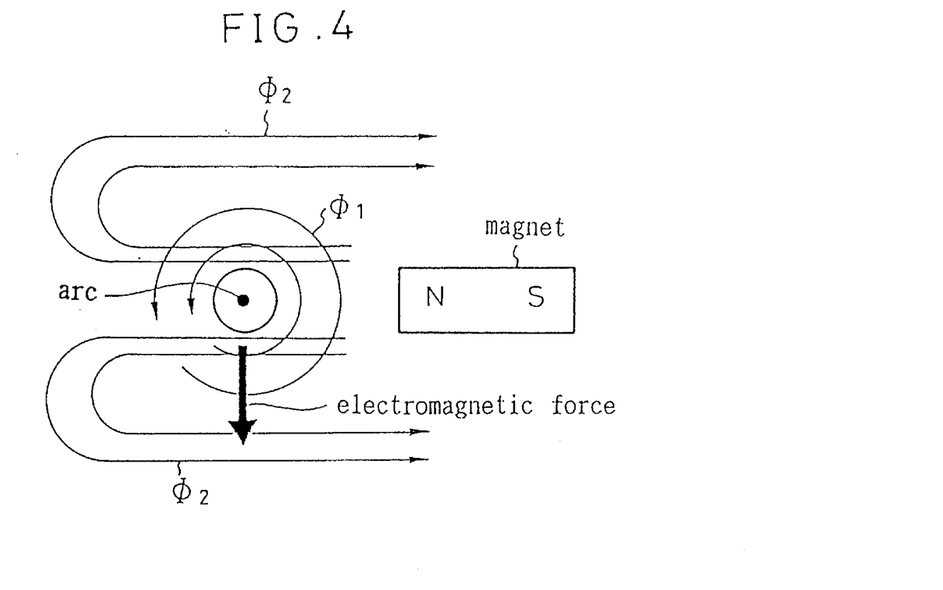
FIG. 4 is an explanatory view of the principle of producing an electromagnetic force by a magnet used in the embodiment of a lamp unit shown in FIG. 1.

Since the arc is produced by the electrons which flow from the negative pole to the positive pole of the lamp, the arc is considered to be what is called an electric current, and a magnetic field is produced around the arc. When the lamp is disposed perpendicularly to the plane of the drawing and lighted, as shown in FIG. 4, if the positive pole of the lamp is on the reverse side of the drawing and the negative pole is on the plane of the drawing, the counterclockwise line $\Phi 1$ of magnetic flux is produced around the arc.

If the magnet is disposed on the right side of the lamp with the N pole directed to the lamp, the line $\Phi 2$ of magnetic flux is produced from the N pole to the S pole.

The electromagnetic force produced by the line $\Phi 1$ of magnetic flux and the the line $\Phi 2$ of magnetic flux acts in the direction in which the arc is pressed down.

Accordingly, when the lamp is horizontally installed as described above, the force for bending the arc upward caused by the convection current is cancelled by the downward electromagnetic force, so that the distortion of the arc is prevented.

Furthermore, by using an ferromagnetic plate for the upper wall portion of the lamphouse, the stability of the arc is enhanced.

In the optical analyzer provided in the sixth aspect of the present invention, which incorporates the horizontally installed lamp unit, the height can be maintained to be small, so that it is possible to dispose an optical system and an electric system in the upper portion and the lower portion of the lamphouse, thereby increasing the degree of freedom in designing. In addition, it is possible to provide a lamp insertion hole having a comparatively small diameter on the side surface of the analyzer, so that it is possible to replace the lamp while another apparatus is laid on the analyzer.

To achieve the second object, in a seventh aspect of the present invention, there is provided an optical analyzer comprising: a lamp removably installed in the case of the main body of the optical analyzer in the vicinity of an opening which is provided in the wall portion of the case and which is large enough to pass at least the lamp therethrough; a fan provided in such a manner as to fill up the opening; and a lamp replacing mechanism for replacing the lamp from the outside of the case through the opening.

In an optical analyzer provided in an eighth aspect of the present invention, the lamp is placed in a cartridge which removably accommodates the lamp, which can be freely mounted on and removed from the case of the main body and which is provided with terminals connected to the current supply terminals of the lamp when the cartridge is mounted at a predetermined position of the case. The opening is large enough to allow the cartridge accommodating the lamp to pass therethrough, thereby allowing the lamp accommodated in the cartridge to be taken out of or inserted into the case at the time of replacement.

It is further preferable that the fan is rockably hinged to the peripheral portion of the opening.

According to the lamp replacing mechanism in the optical analyzer provided in the seventh aspect of the present invention, the lamp is disposed in the vicinity of the opening formed in the wall portion of the case so as to attach a cooling fan to the lamp unit. The opening is large enough to allow the lamp to pass therethrough, so that the user can replace the lamp with easiness from the outside of the case through the opening. In other words, it is possible to mount the lamp from the outside of the case without the need for removing the outer cover constituting a part of the case.

It is therefore not necessary to form an opening specially for a lamp replacing operation in the case of the main body of the analyzer, thereby eliminating the fear of lowering the mechanical strength. In addition, since it is not necessary to secure the space for this opening, the degree of freedom in designing is not reduced.

In the lamp replacing mechanism of the optical analyzer provided in the eighth aspect of the present invention, since it is possible to draw out or mount lamp of in the state of being accommodated in the cartridge, the replacement of the lamp is more facilitated.

In addition, by rockably hinging the fan to the peripheral portion of the opening, it is possible to prevent an electric connection failure or the like which may be caused at the time of removing or mounting the fan.

As described above, according to the optical analyzer provided with such a lamp replacing mechanism of the present invention, it is possible to form a lamp insertion hole without lowering the mechanical strength of the analyzer and the degree of freedom in designing, and it is possible to complete the replacement of the lamp by a simple operation.

The above and other objects, features and advantages of the present invention will become clear from the following description of the preferred embodiments thereof, taken in conjunction with the accompanying drawings.

DESCRIPTION OF THE PREFERRED EMBODIMENTS

The preferred embodiments of the present invention will be explained hereinunder with reference to the drawings.

Figure 1A:
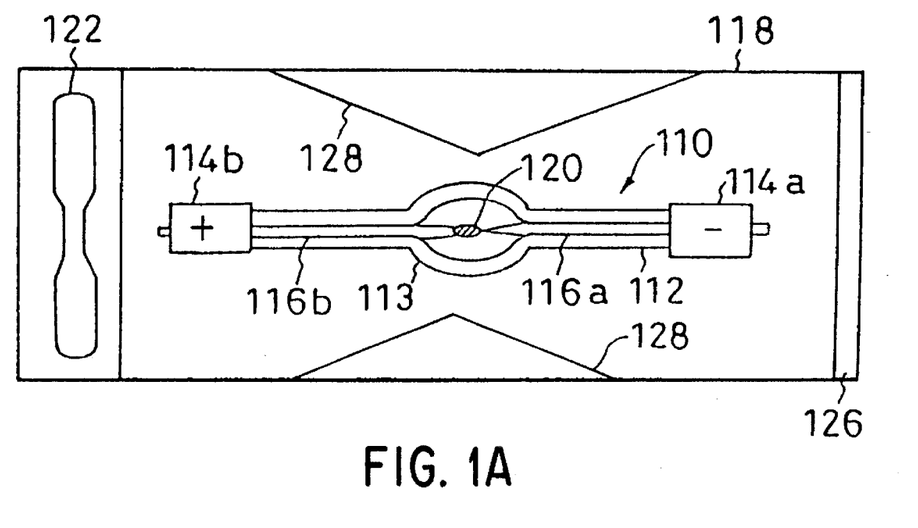
FIG. 1 is a schematic explanatory view of the structure of an embodiment of a lamp unit according to the present invention.
Figure 1B:
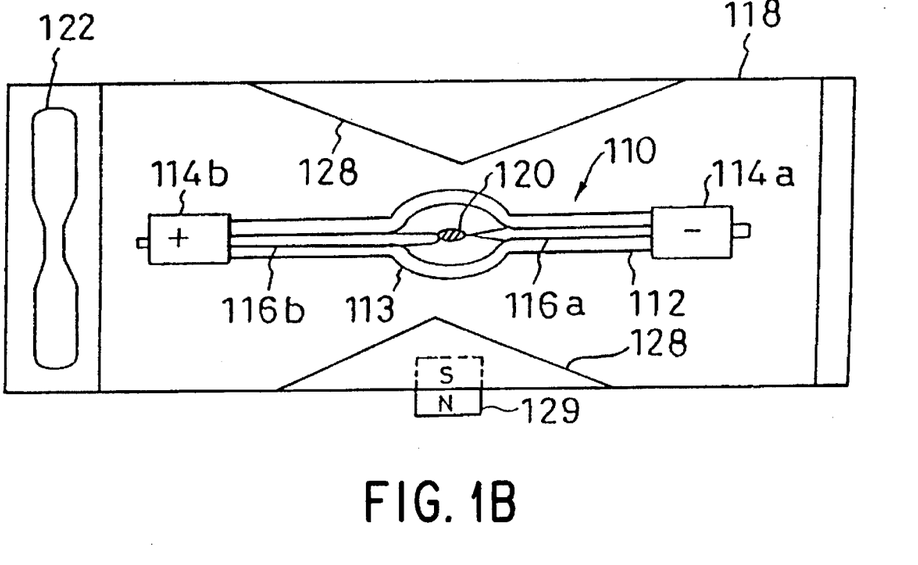

FIG. 1 schematically shows the structure of an embodiment of a lamp unit according to the present invention, wherein FIG. 1(A) is a side elevational view thereof and FIG. 1(B) is a plan view thereof. The elements which correspond to the elements in the conventional lamp unit shown in FIGS. 5 and 6 are indicated by the same numerals prefixed by the numeral 1, and explanation thereof will be omitted.

The lamp unit shown in FIG. 1 is provided with a lamphouse 118, a xenon lamp 110, a fan 122 and a fin 128 as a projecting portion.

The xenon lamp 110 is composed of a long and narrow bulb 112, electrode bases 114a, 114b into which both ends of the bulb 112 are fitted, and electrode cores 116a, 116b implanted in the electrode bases 114a and 114b, respectively. The xenon lamp 110 is horizontally installed in the lamphouse 118.

A spherical bulb portion 113 is formed at the center of the bulb 112, and the tips of the electrode cores 116a and 116b are in close proximity with each other in the spherical bulb portion 113.

A high voltage is applied to the electrode bases 114a, 114b so as to cause arc discharge between the electrode cores 116a and 116b and to light the xenon lamp 110 thereby.

When the xenon lamp 110 is lighted, the convection current of the xenon gas is produced in the spherical bulb portion 113, as shown in FIG. 7, and the heat of the arc 120 is carried on the convection current upward in the spherical bulb portion 113, so that the temperature of a part of the tube wall of the spherical bulb portion 113 abnormally rises, as described above.

It is therefore necessary to increase the heat dissipation efficiency and restrict the temperature rise to a tolerance range. It is effective for increasing the heat dissipation efficiency to cool the bulb 112, particularly, the spherical bulb portion 113, which produces a high-temperature heat, with air at high speed.

For this reason, a lamp unit of this embodiment is provided with the fan 122 at one end of the lamphouse 118, and a vent 126 at the other end thereof.

When the fan 122 is rotated, the air outside of the lamphouse 118 is sucked and exhausted from the vent 126. In this way, the lamphouse 118 is ventilated and the bulb 112 is cooled with air.

It has been found that when the 150-W xenon lamp 110, which is generally used as a light source of a fluorescence detector or the like, is air-cooled, the wind velocity at the spherical bulb portion 113 must be not less than 3 m/sec in order to limit the temperature rise in the spherical bulb portion 113 to a tolerance value.

In order to cause air to flow at a rate of not less than 3 m/sec, however, the sucking force of the fan 122 must be very strong, which necessitates a large fan.

If such a large fan is attached to the optical analyzer, the size of an optical analyzer as a whole is increased although the xenon lamp 110 is horizontally installed. In other words, the effect of horizontally installing the xenon lamp 110 is reduced.

As a countermeasure, in this embodiment, the fin (projecting portion) 128 is provided on the inner wall of the lamphouse 118 so as to obtain the necessary wind velocity from the small fan 122.

The fin 128 provided on the inner wall of the lamphouse 118 is inclined toward the spherical bulb portion 113, so that the inner diameter of the lamphouse 118 around the spherical bulb portion 113 is smaller than the inner diameter of the lamphouse 118 at both ends on the air inlet side and on the air outlet side.

Therefore, the air sucked by the fan 122 flows at a higher speed as it approaches the spherical bulb portion 113, which is positioned at the apex of the fin 128.

As a result, even if the sucking force of the fan 122 is small and the wind velocity on the air inlet side of the lamphouse 118 is low, the wind velocity increases around the spherical bulb portion 113. Thus, the small fan 122 can sufficiently air-cool the spherical bulb portion 113.

Since the inner diameter of the spherical bulb portion 113 becomes larger again as it approaches the vent 126 from the periphery of the spherical bulb portion 113, the wind velocity of the air exhausted from the vent 126 is low, so that it is possible to install the optical analyzer without taking the influence of exhausted air into any consideration.

Figure 8:
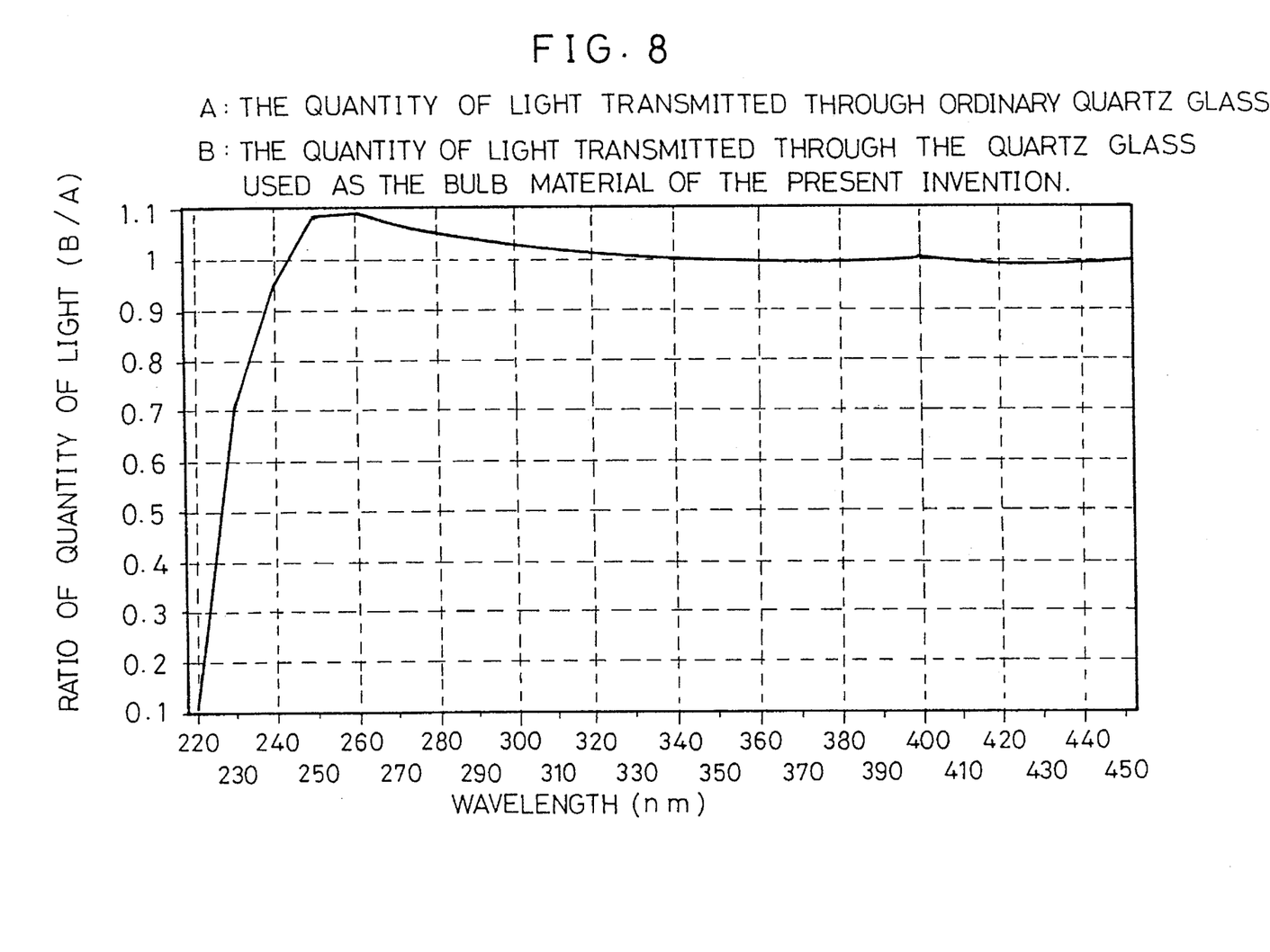
FIG. 8 is an explanatory view of the ratio of the quantity of light transmitted through ordinary quartz glass and the quantity of light transmitted through the quartz glass used as the bulb material of the present invention for each wavelength.

The bulb material of the xenon lamp 110 in this embodiment is quartz glass having an extremely low transmission with respect to ultraviolet ray of not more than 220 nm. When the abnormal temperature rise is prevented by air-cooling the xenon lamp 110, as described above, distortion is accumulated in the spherical bulb portion 113 when the xenon lamp 110 transmits ultraviolet ray of not more than 220 nm. By using quartz glass having an extremely low transmission with respect to ultraviolet ray of not more than 220 nm in comparison with ordinary quartz glass, as shown in FIG. 8, the ultraviolet ray is prevented from being transmitted through the bulb 112 and a distortion of the spherical bulb portion 113 is prevented.

As described above, in the lamp unit of this embodiment, since the fin 128 is provided so that the inner diameter of the inner wall of the lamphouse 118 is the smallest around the spherical bulb portion 113, the wind velocity is the highest around the spherical bulb portion 113, so that the spherical bulb portion 113 is air-cooled with efficiency, thereby solving the problem of an extreme temperature rise in the spherical bulb portion 113 which is produced when the xenon lamp 110 is horizontally installed in the related art.

In addition, the wind velocity is increased only in the vicinity of the spherical bulb portion 113 having a very high temperature so as to enhance the air-cooling effect, while the wind velocity is reduced at both end portions of the bulb 112, where the temperature is comparatively low, so as to suppress the air-cooling effect. It is therefore possible to reduce the difference of temperature in localities of the lamp, thereby preventing the mechanical strength of the lamp from being lowered.

The lamp unit of this embodiment is also provided with a magnet 129 on the wall surface of the lamphouse 118 surrounding the spherical bulb portion 113.

As described above, when the xenon lamp 110 is horizontally installed, the arc 120 of the spherical bulb portion 112 is pushed upward and distorted by the convection current.

To prevent this, in this embodiment, the magnet 129 is disposed, as shown in FIG. 1(B). If it is assumed that the electrode on the right side of the drawing is a negative pole, and the electrode on the left side of the drawing is a positive pole, the magnet 129 is disposed with the S pole directed to the spherical bulb portion 113 and the N pole directed to the wall surface. The magnetic fluxs are produced, as shown in FIG. 4, and the arc 120 is pressed down by the electromagnetic force. By adjusting the electromagnetic force by the force of the magnet 129 or the position at which the magnet 129 is disposed or the like so that the force of pushing upward the arc 120 caused by the convection current is balanced with the downward electromagnetic force, it is possible to prevent a distortion of the arc 120.

Figure 2:
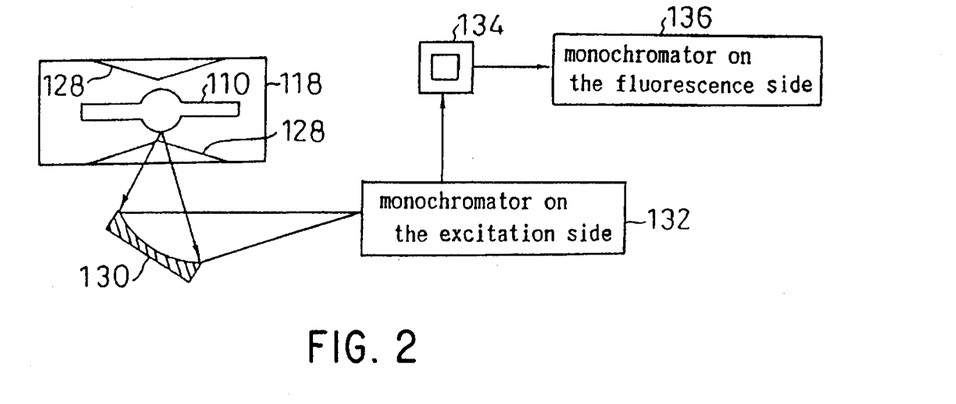
FIG. 2 is an explanatory view of the structure of a fluorescence detector as an embodiment of an optical analyzer according to the present invention.

FIG. 2 is an explanatory view of the structure of a fluorescence detector as an embodiment of an optical analyzer according to the present invention.

In the fluorescence detector shown in FIG. 2, the xenon lamp 110 installed in the lamphouse 118 is used as a light source, and the light projected from the xenon lamp 119 and collected by a converging mirror 130 enters a monochromator 132 on the excitation side. The excitation light is emitted from the exit slit of the monochromator 132 and projected onto the sample in a cell 134. The fluorescence emitted from the sample enters a monochromator 136 on the fluorescence side and is measured by the monochromator 136.

Figure 3A:
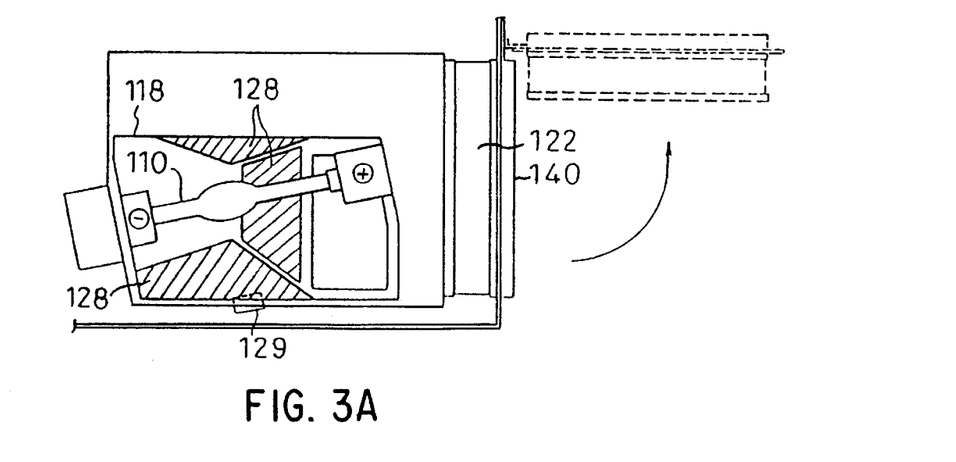
FIG. 3 is a schematic explanatory view of the structure of the peripheral portion of the lamp unit in the embodiment of a fluorescence detector shown in FIG. 2.
Figure 3B:
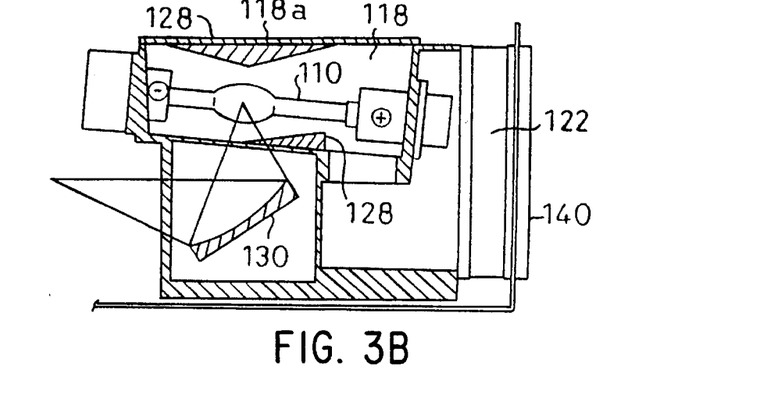

The fluorescence detector uses a lamp unit composed of the xenon lamp 110 horizontally installed in the lamphouse 118. FIG. 3 schematically shows the structure of the peripheral portion of the lamp unit of the fluorescence detector, wherein FIG. 3(A) is a plan view thereof and FIG. 3(B) is a side elevational view thereof. The same numerals are provided for the elements which are the same as those shown in FIG. 1, and explanation thereof will be omitted.

As is clear from FIG. 3, by horizontally installing the xenon lamp 110, it is possible to produce the thin lamphouse 118. As a result, in the case of using the xenon lamp 110 having a length of, for example, about 150 mm, it is possible to hold down the height of the fluorescence detector as a whole to not more than 150 mm. In addition, it is possible to dispose the converging mirror 130 below the lamphouse 118, as shown in FIG. 3(B).

In contrast, if the xenon lamp 110 is vertically installed as in the related art, when a mechanism of applying a high voltage to the electrodes of both ends of the xenon lamp 110 is taken into consideration, the entire height of the fluorescence detector exceeds 200 mm.

In this way, according to this embodiment, a fluorescence detector can be thin and compact, the degree of freedom in designing is increased, and the efficiency of collecting the light from the xenon lamp 110 can be enhanced.

It is preferable to use an iron plate for the upper wall portion 118a of the lamphouse 118 in FIG. 3(B). When the magnet 129 is disposed in FIG. 3(B), although a distortion of the arc 120 is prevented, the stability of the arc 120 is lowered. As a result of studies undertaken by the present inventors, it has been found that the stability of the arc 120 is enhanced and that the influence of the outside magnetic field on the arc 120 is well prevented when an iron plate is used for the upper wall portion 118a.

In FIG. 3(B), the small fan 122 and a dust filter 140 provided on the outside of the fan 122 so as to remove dust or the like in the air are disposed on the side surface of the fluorescence detector in such a manner as to fill up the opening as a lamp insertion hole and to be freely opened and closed. When the fan 122 and the dust filter 140 are opened, it is easy to replace the xenon lamp 110 through the lamp insertion hole. A lamp replacing mechanism in this embodiment will be described later.

As described above, it is often the case that another apparatus is laid on the fluorescence detector for fluorescence analysis, and this tendency is remarkable especially in a fluorescence detector for liquid chromatograph.

Since the fluorescence detector is often used for a reaction system, many apparatuses are used, so that in order to effectively use a space, it is necessary to lay one apparatus on top of another.

It is therefore preferable to provide a lamp insertion hole on the side surface of the fluorescence detector. In a conventional vertically installed xenon lamp, however, a very large insertion hole is necessary, which leads to problems of a reduced degree of freedom in designing and a lowering of the mechanical strength.

On the other hand, in the lamp unit of this embodiment, since the xenon lamp 110 is horizontally installed, the lamp insertion hole slightly larger than the diameter of the xenon lamp 110 suffices. In addition, since the fan 122 is mounted in the lamp insertion hole, it is easy to replace the xenon lamp 110 through the lamp insertion hole without lowering the degree of freedom in designing and the mechanical strength.

A lamp replacing mechanism in this embodiment will now be explained in detail with reference to FIGS. 9 to 13.

Figure 9:
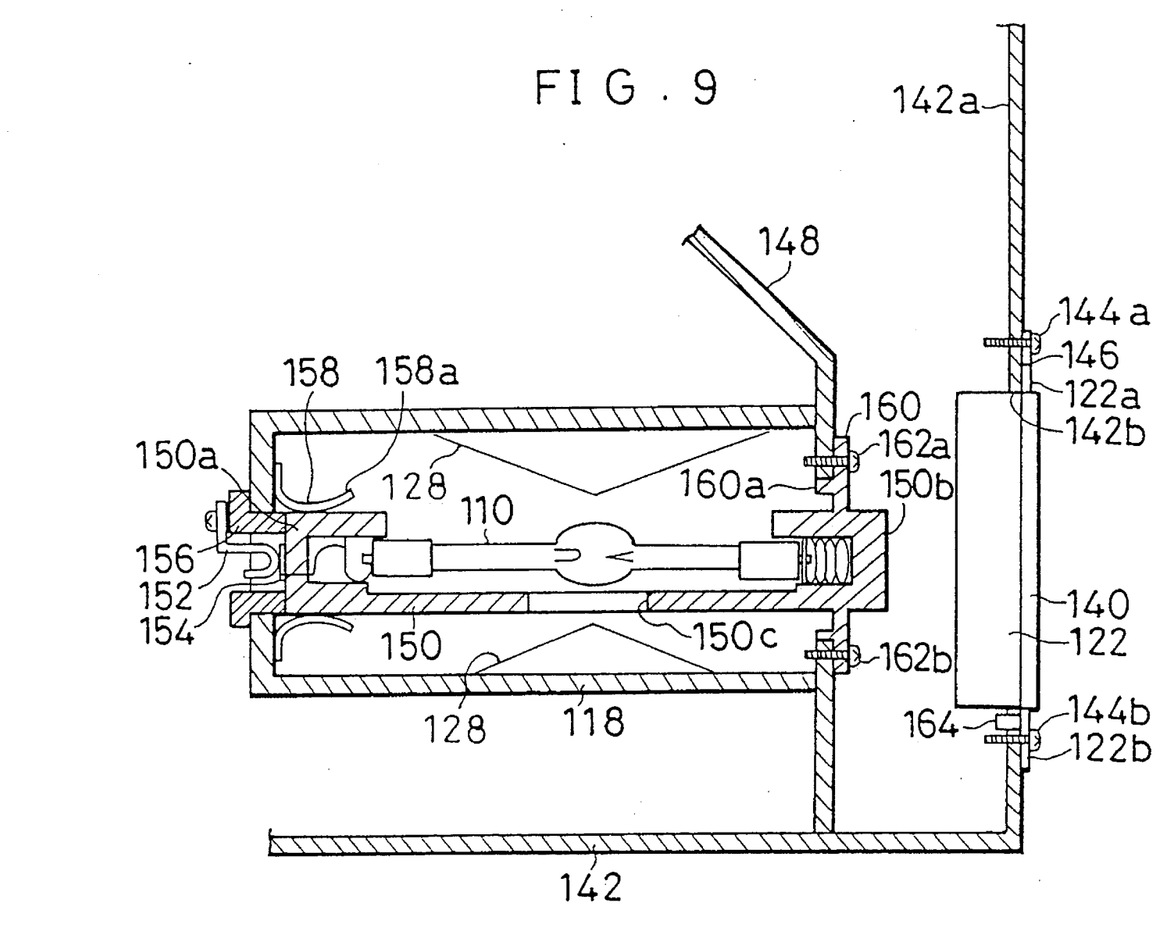
FIG. 9 is a schematic explanatory view of the structure of an example of a lamp replacing mechanism in the embodiment shown in FIG. 2.
Figure 10:
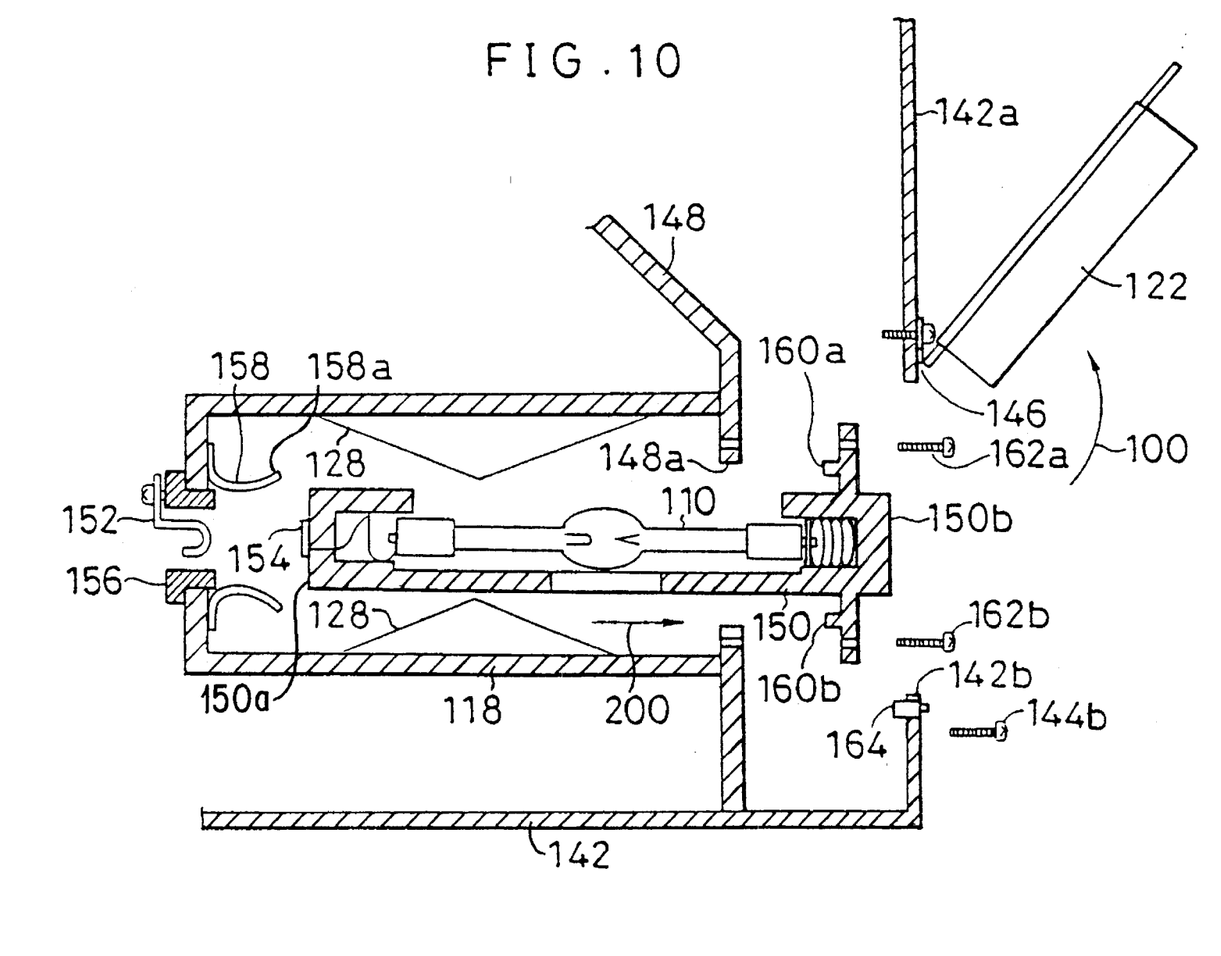
FIG. 10 is an explanatory view of a lamp replacing operation using the lamp replacing mechanism shown in FIG. 9.

FIG. 9 shows an example of a lamp replacing mechanism used in the fluorescence detector of this embodiment. FIGS. 9 and 10 schematically show the structure of the lamp replacing mechanism of the fluorescence detector.

In FIGS. 9 and 10, the xenon lamp 110 is installed in the lamphouse 118 in the casing 142 of the fluorescence detector.

An opening 142b for receiving the cooling fan 122 is provided at a predetermined position of the side wall 142a of the casing 142. The cooling fan 122 is fitted into the opening 142b. The dust filter 140 is attached to the cooling fan 122 so as to prevent dust or the like from entering the fluorescence detector. A flange portion 122a is formed on the side portion of the cooling fan 122 so that the cooling fan 122 is fixed to the side wall 142a of the casing 142 by bolts 144a, 144b at the flange portion 122a. A hinge 146 is fixed to the flange portion 122a on the bolt 144a side.

The xenon lamp 110 is disposed in the vicinity of the opening 142b in the casing 142. In other words, the xenon lamp 110 is disposed at the position which facilitates the removal and mounting of the xenon lamp 110 by a worker from the outside of the opening 142b. The lamphouse 118 is firmly fixed to the frame portion 148 in the casing 142.

In this embodiment, the xenon lamp 110 accommodated in a cartridge 150 is installed. The cartridge 150 is provided with two contacts at both ends for electrically connecting the contacts with the contacts of the xenon lamp 110 and facilitates the mounting and removal of the xenon lamp 110. A terminal 154 which is to be electrically connected to the electric current supply terminal 152 provided on the lamphouse 118 is provided on the outer surface of the forward end portion 150a of the cartridge 150 so that the xenon lamp 110 is appropriately electrically connected in the appropriately mounted state shown in FIG. 9. The electric current supply terminal 152 is attached to a cylindrical fluorocarbon polymers cap 156 fitted into the side wall of the lamphouse 118 opposite to the opening 142b, and a clamping means 158 is attached to the innermost wall of the lamphouse 118 so as to clamp the cartridge 150 with a predetermined biasing force while maintaining the terminals 152 and 154 in a good electrically contact state.

A flange portion 160 is formed on the tail end portion 150b of the cartridge 150 so that the cartridge 150 is fixed to the frame portion 148 of the casing 142 by a bolt 162 at the flange portion 160.

It is preferable that the cartridge 150 is composed of a material such as a ceramic which keeps good electrical insulation and which has excellent light resistance and heat resistance. Since the temperature of the portion which is in close proximity to the xenon lamp 110 becomes high, it is preferable to provide an opening 150c at this portion.

A lamp replacing operation in this embodiment will now be explained with reference to FIG. 10.

FIG. 10 shows the process of removing the xenon lamp 110.

As shown in FIG. 10, the bolt 144b is first removed and the cooling fan 122 is rotated in the direction indicated by the arrow about the hinge 146 so that the opening 142b of the casing 142 is exposed. Bolts 162a, 162b are then removed with a hand inserted through the opening 142b and the cartridge 150 is drawn through the opening in the direction indicated by the arrow 200. Since the forward end portion 150a of the cartridge 150 is only clamped by the clamping means 158, it is possible to remove the cartridge 150 with easiness simply by drawing it in the direction indicated by the arrow 200.

When the cartridge 150 is taken outside of the casing 142, the xenon lamp 110 is replaced, and the cartridge 150 is inserted in to the casing 142 again through the opening 142b. The forward end portion 150a of the cartridge 150 is inserted into the clamping means 158 through an opening 148a of the frame portion 148. Since the end portion of the clamping means 158 is extended outward, the inserting operation is very easy. When the forward end portion 150a is inserted into a predetermined position, the terminal 154 is appropriately connected to the terminal 152. In this state, the small projections 160a, 160b formed on the inside of the flange portion 160 of the tail end 150b of the cartridge 150 are engaged with the opening 148a of the frame portion 148. By tightening the bolts 162a, 162b in this state, the cartridge 150 is mounted in the casing 142.

In this way, according to this lamp replacing mechanism, the process of replacing the xenon lamp 110 includes only a very simple operation comprising the removal and mounting of the three bolts and the drawing and insertion of the cartridge besides the replacement of the xenon lamp 10.

In other words, a laborious operation such as the removal of the outer cover of the casing 142 is dispensed with. In addition, the opening 142b of the casing 142 is not formed exclusively for a lamp replacing operation, but the opening 142 formed in order to attach the cooling fan 122 to the lamphouse 118 is utilized, so that the mechanical strength of the casing 142 is not lowered. Therefore, increase in the number of parts for forming another opening is not necessary, thereby eliminating a fear of rise in the cost of the analyzer as a whole.

In this lamp replacing mechanism, a microswitch 164 is attached to the vicinity of the opening 142b so that the power of the analyzer is turned off whenever the cooling fan 122 is opened.

The structure of the cartridge 150 is not restricted to the above example, and various structures may be adopted so long as they enable the removal and mounting of the xenon lamp 110.

Figure 11:
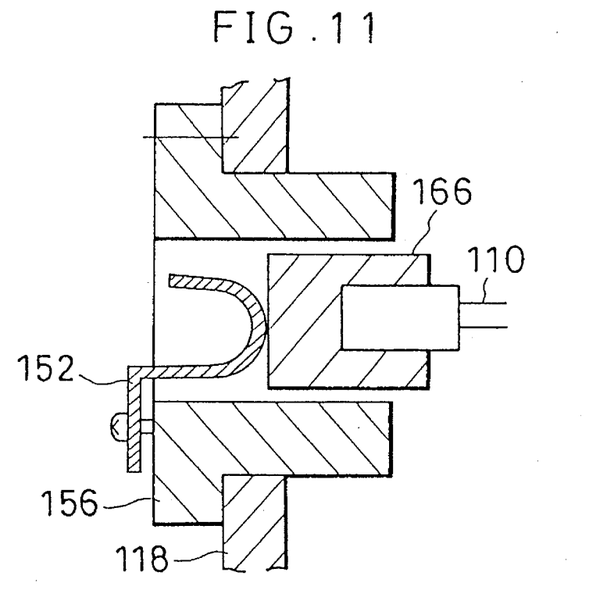
FIG. 11 is an explanatory view of the structure of the main part of another example of a lamp replacing mechanism.
Figure 12:
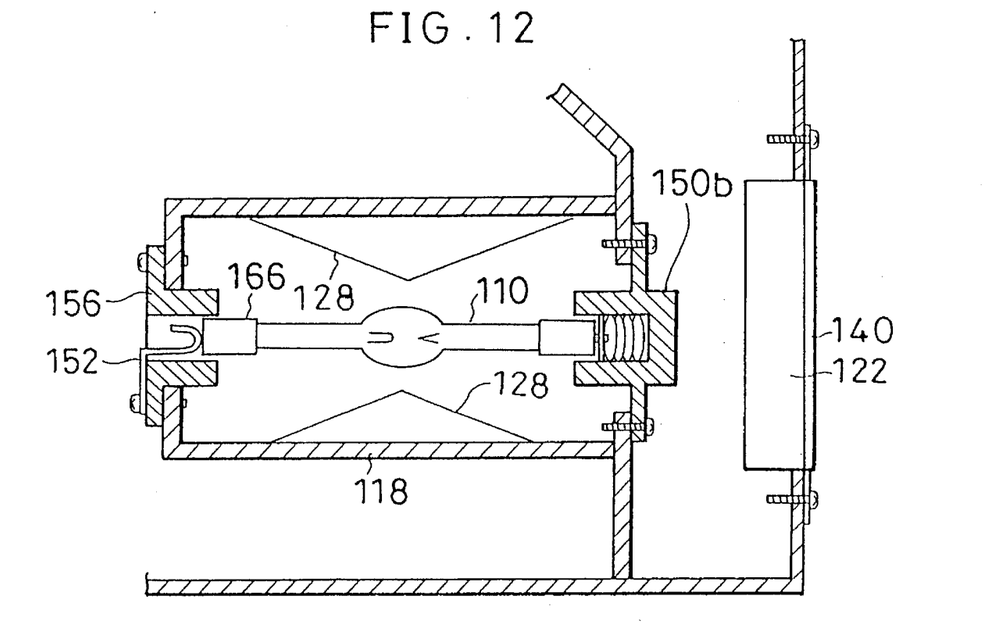
FIG. 12 shows the lamp mounted by the lamp replacing mechanism shown in FIG. 11.
Figure 13:
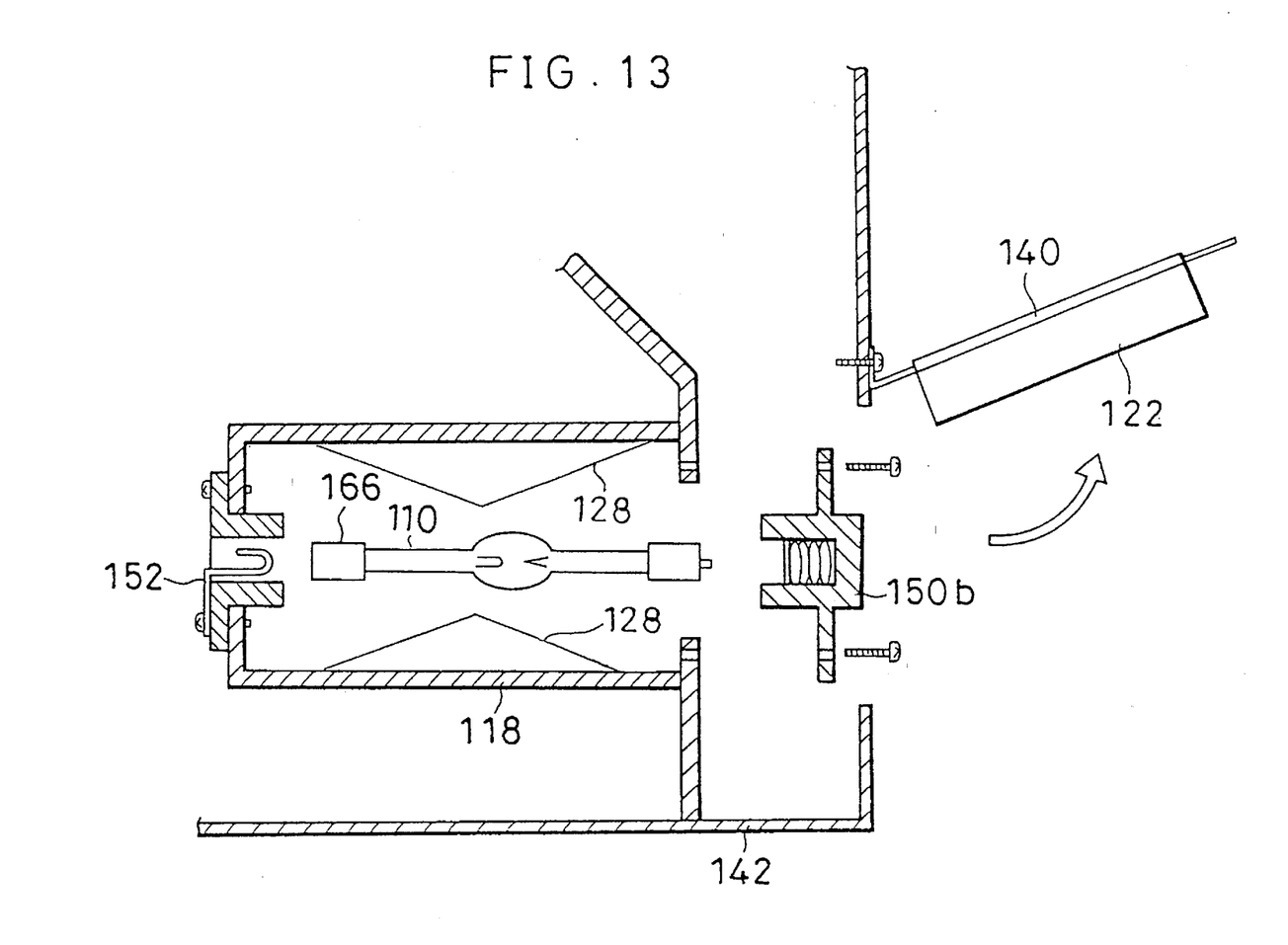
FIG. 13 shows the lamp removed by the lamp replacing mechanism shown in FIG. 11.

FIGS. 11 to 13 show another example of a lamp replacing mechanism. The same numerals are provided for the elements which are the same as those shown in FIG. 9, and explanation thereof will be omitted.

In this example, an electrode cap 166 is placed over both electrodes of the xenon lamp 110 so as to keep a good electrical contact with the terminal 152, as shown in an enlarged view in FIG. 11. When the xenon lamp 110 in the state shown in FIG. 12 is removed, the xenon lamp 110 is removed together with the electrode caps 166, as shown in FIG. 13.

In this way, in the present invention, the cartridge 150 for accommodating the xenon lamp 110 is not always necessary, and the xenon lamp 110 itself may be removed and inserted through the opening 142b without reducing the effect of the present invention.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An optical analyzer comprising:

a lamp removably installed in a case of a main body of said optical analyzer in the vicinity of an opening which is provided in a wall portion of said case and which is large enough to pass at least said lamp therethrough;

a fan provided at the wall portion of said case in such a manner as to fill up said opening;

a lamp replacing mechanism for replacing said lamp from the outside of said case through said opening; and a means for analyzing light emitted from said lamp assembly.

2. An optical analyzer according to claim 1, wherein said lamp is placed in a cartridge which removably accommodates said lamp, which is mounted on and removed from said case of the main body and which is provided with terminals connected to the current supply terminals of said lamp when said cartridge is mounted at a predetermined position of said case;

said opening is large enough to allow said cartridge accommodating said lamp to pass therethrough; and said lamp is replaced in the state of being accommodated in said cartridge.

3. An optical analyzer according to claims 1, wherein said fan is rockably hinged to the periphery of said opening.

* * * * *